US012170068B2

(12) United States Patent
Park et al.

(10) Patent No.: US 12,170,068 B2
(45) Date of Patent: Dec. 17, 2024

(54) BACKLIGHT APPARATUS AND OPERATING METHOD THEREOF

(71) Applicant: SAMSUNG ELECTRONICS CO., LTD., Suwon-si (KR)

(72) Inventors: Junil Park, Suwon-si (KR); Sugyeung Kang, Suwon-si (KR); Yongil Kwon, Suwon-si (KR); Kang Joo Kim, Suwon-si (KR); Alan Kyongho Kim, Suwon-si (KR); Sunkwon Kim, Suwon-si (KR); Yong-Yun Park, Suwon-si (KR); Jung-Pil Lim, Suwon-si (KR); Hyunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/208,543

(22) Filed: Jun. 12, 2023

(65) Prior Publication Data

US 2024/0127764 A1 Apr. 18, 2024

(30) Foreign Application Priority Data

Oct. 17, 2022 (KR) ........................ 10-2022-0133213

(51) Int. Cl.
*G09G 3/34* (2006.01)
*G09G 5/00* (2006.01)

(52) U.S. Cl.
CPC ........... *G09G 3/3426* (2013.01); *G09G 5/008* (2013.01)

(58) Field of Classification Search
CPC ................. G09G 3/3426; G09G 5/008; G09G 2370/10; G09G 3/2085; G09G 3/32; G09G 3/3406; G09G 3/36; G09G 2310/08; G09G 2320/0626; H05B 45/30
See application file for complete search history.

(56) References Cited

U.S. PATENT DOCUMENTS

| | | | |
|---|---|---|---|
| 8,207,954 B2 | 6/2012 | Cok et al. |
| 8,344,996 B2 | 1/2013 | Lai et al. |
| 8,878,792 B2 | 11/2014 | Lim et al. |
| 9,240,227 B2 | 1/2016 | Pyeon et al. |
| 9,461,810 B2 | 10/2016 | Han |
| 11,327,855 B2 | 5/2022 | Kim et al. |

(Continued)

FOREIGN PATENT DOCUMENTS

| | | |
|---|---|---|
| KR | 10-2018-0032738 A | 4/2018 |
| KR | 10-2022-0047113 A | 4/2022 |
| KR | 10-2022-0096091 A | 7/2022 |

*Primary Examiner* — Grant Sitta
(74) *Attorney, Agent, or Firm* — Sughrue Mion, PLLC

(57) ABSTRACT

In a backlight apparatus, a master driving circuit generates a transmission frame including a training period including a clock training pattern and a data period including a plurality of data packets respectively corresponding to the plurality of blocks. A plurality of slave driving circuits correspond to the plurality of blocks, respectively, and are connected to the master driving circuit in a daisy chain structure. Each slave driving circuit receives the transmission frame through the daisy chain structure, recovers a clock based on the clock training pattern, and drives the plurality of light emitting elements included in a corresponding block among the plurality of blocks based on its own data packet among a plurality of data packets.

20 Claims, 10 Drawing Sheets

(56) References Cited

U.S. PATENT DOCUMENTS

| | | | | |
|---|---|---|---|---|
| 11,488,548 | B2 | 11/2022 | Kim et al. | |
| 2011/0096099 | A1* | 4/2011 | Yamamoto | H05B 45/46 345/690 |
| 2013/0113777 | A1 | 5/2013 | Baek et al. | |
| 2020/0145181 | A1* | 5/2020 | Kim | H04L 7/044 |
| 2022/0122519 | A1 | 4/2022 | Bower et al. | |
| 2023/0154378 | A1* | 5/2023 | Kwon | G09G 3/2092 |

* cited by examiner

BACKLIGHT APPARATUS AND OPERATING METHOD THEREOF

CROSS-REFERENCE TO RELATED APPLICATION

This application claims priority to Korean Patent Application No. 10-2022-0133213, filed on Oct. 17, 2022, in the Korean Intellectual Property Office, the disclosure of which is incorporated by reference herein in its entirety.

BACKGROUND

(a) Field

The disclosure relates to a backlight apparatus and an operating method thereof.

(b) Description of the Related Art

A display device may include a display panel displaying an image. When a light-receiving display panel such as a liquid crystal display (LCD) panel is used as the display panel, the display device may include a backlight apparatus. The backlight apparatus may include a plurality of light emitting diodes (LEDs) and may be disposed on a rear side of the display panel.

In recent display devices, a large number of LEDs may be arranged on the rear side of the display panel, and accordingly, a large number of driving circuits may be required to drive the LEDs. However, when the number of driving circuits increases, the number of wires for connecting the driving circuits may increase. As a result, a problem of transferring data for driving the LEDs to the driving circuit may occur.

SUMMARY

One or more embodiments may provide a backlight apparatus and an operating method thereof for efficiently transferring data.

According to an aspect of an example embodiment, a backlight apparatus includes: a plurality of blocks, each of the plurality of blocks comprising a plurality of light emitting elements; a master driving circuit configured to generate a transmission frame comprising a training period and a data period, the training period comprising a clock training pattern, and the data period comprising a plurality of data packets respectively corresponding to the plurality of blocks; and a plurality of slave driving circuits respectively corresponding to the plurality of blocks and connected to the master driving circuit in a daisy chain structure, each of the plurality of slave driving circuits configured to: receive the transmission frame through the daisy chain structure, recover a clock based on the clock training pattern, and drive the plurality of light emitting elements in a corresponding block among the plurality of blocks based on its own data packet among the plurality of data packets.

According to an aspect of an example embodiment, a backlight apparatus includes: a plurality of blocks, each of the plurality of blocks comprising a plurality of light emitting elements; a master driving circuit configured to generate a transmission frame comprising a data period comprising a plurality of data packets respectively corresponding to the plurality of blocks; and a plurality of slave driving circuits respectively corresponding to the plurality of blocks and connected to the master driving circuit in a daisy chain structure, each of the plurality of slave driving circuits configured to: receive the transmission frame through the daisy chain structure, transfer a frame obtained by masking at least a part of its own data packet in the transmission frame received through the daisy chain structure as the transmission frame of a next slave driving circuit among the plurality of slave driving circuits, and drive the plurality of light emitting elements in a corresponding block among the plurality of blocks based on its own data packet among the plurality of data packets.

According to an aspect of an example embodiment, a method of operating a backlight apparatus comprising a plurality of blocks includes: generating a transmission frame comprising a clock training pattern and a plurality of data packets respectively corresponding to the plurality of blocks; transferring the transmission frame to a plurality of driving circuits respectively corresponding to the plurality of blocks and connected in a daisy chain structure; and recovering a clock based on the clock training pattern in each of the plurality of driving circuits.

BRIEF DESCRIPTION OF DRAWINGS

The above and other aspects and features will be more apparent from the following description of example embodiments, taken in conjunction with the accompanying drawings, in which.

DETAILED DESCRIPTION OF THE EMBODIMENTS

Figure 1:
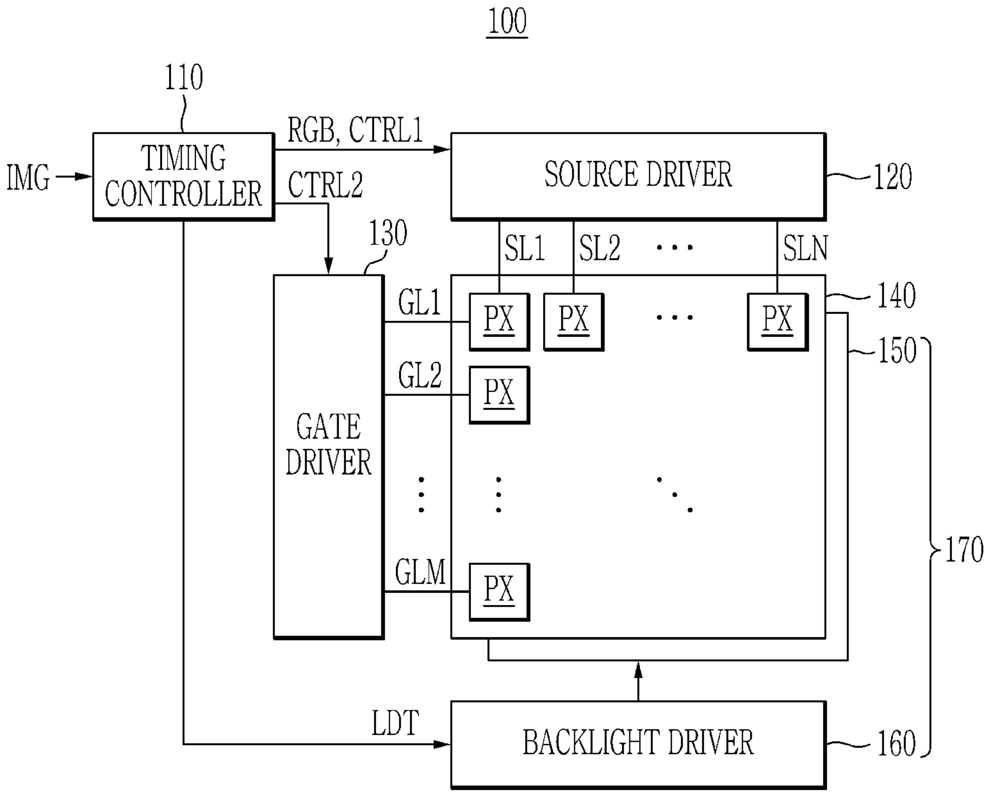
FIG. 1 is a diagram illustrating an example of a display device according to some embodiments.

In the following detailed description, only certain embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a diagram illustrating an example of a display device according to some embodiments.

Referring to FIG. 1, a display device 100 may include a timing controller 110, a source driver 120, a gate driver 130, a display panel 140, a backlight unit 150, and a backlight driver 160. The backlight unit 150 and the backlight driver 160 may form a backlight apparatus 170 that operates as a light source of the display panel 140. In some embodiments, the display device 100 may be mounted on an electronic device having an image display function.

The display panel 140 may include a plurality of source lines SL1, SL2 . . . SLN, a plurality of gate lines GL1, GL2 . . . GLM, and a plurality of pixels PX. The source lines SL1 to SLN may extend substantially in a column direction, and the gate lines GL1 to GLM may extend substantially in a row direction. Each pixel PX may be connected to a corresponding source line among the source lines SL1 to SLN and a corresponding gate line among the gate lines GL1 to GLM. In some embodiments, the display panel 140 may be, for example, a liquid crystal display panel.

The timing controller 110 may control operations of the display device 100. For example, the timing controller 110 may control the source driver 120 and the gate driver 130 to display image data IMG received from an external device on the display panel 140. The timing controller 110 may generate pixel data RGB based on the image data IMG and provide the pixel data RGB to the source driver 120. Further, the timing controller 110 may provide a control signal CTRL1 for controlling a timing of the source driver 120 to the source driver 120 and a control signal CTRL2 for controlling a timing of the gate driver 130 to the gate driver 130.

The timing controller 110 may generate luminance data LDT representing luminance of the image based on the image data IMG and provide the luminance data LDT to the backlight driver 160. In some embodiments, the luminance data LDT may be generated for each frame. In some embodiments, the timing controller 110 may reflect at least a portion of the luminance data LDT to the pixel data RGB.

The source driver 120 may convert the pixel data RGB received from the timing controller 110 into data signals (e.g., data voltages), and output the data signals to the display panel 140 through the source lines SL1 to SLN. The gate driver 130 may be connected to the gate lines GL1 to GLM of the display panel 140 and sequentially drive the gate lines GL1 to GLM of the display panel 140.

The backlight unit 150 may be disposed on a rear side of the display panel 140. The backlight unit 150 may include a plurality of light emitting elements that emit light under control of the backlight driver 160. In some embodiments, the light emitting element may be, for example, a light emitting diode (LED), although embodiments are not limited thereto. Hereinafter, an embodiment is described in which the light emitting element is an LED, though other embodiments may have a different light emitting element. In some embodiments, the LEDs may be divided into a plurality of dimming blocks respectively corresponding to a plurality of regions of the display panel 140.

The backlight driver 160 may drive the LEDs of the backlight unit 150. The backlight driver 160 may control the LEDs based on the luminance data LDT received from the timing controller 110 so that each LED may emit light with brightness corresponding to the luminance data LDT. In some embodiments, the backlight driver 160 may control the LEDs so that each of the dimming blocks emits individual luminance.

Figure 2:
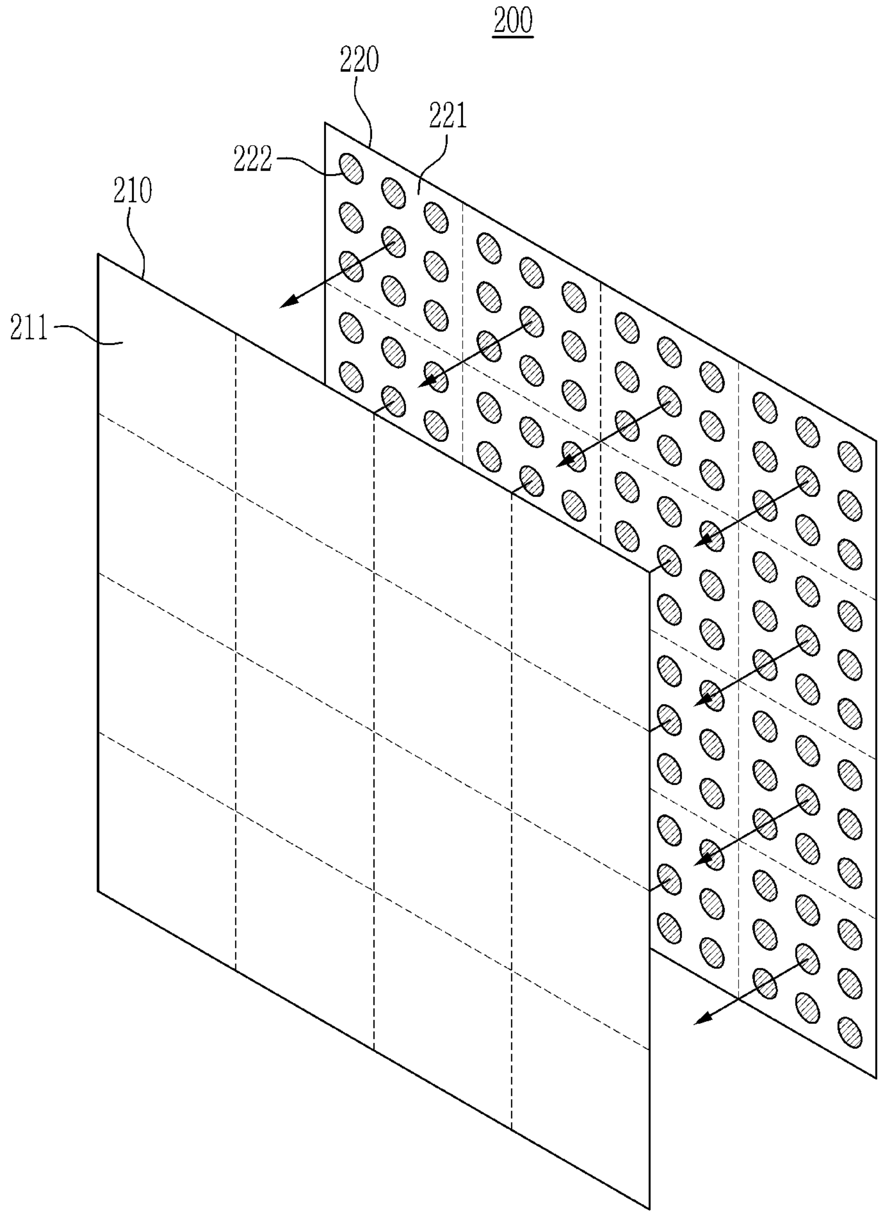
FIG. 2 is a diagram illustrating an example of a display panel and a backlight unit according to some embodiments.

FIG. 2 is a diagram illustrating an example of a display panel and a backlight unit according to some embodiments.

Referring to FIG. 2, a display panel 210 may be divided into a plurality of regions 211. The regions 211 may be divided into and disposed in an array. The array may be an m×n array where m and n are positive integers. The embodiment shown in FIG. 2 illustrates that the display panel 210 is divided into the regions 211 in a 4×4 array. However, embodiments are not limited thereto and m and n may be other integers. For example, the regions 211 may form a 3×4 array, a 4×3 array, a 5×6 array, or a variety of other arrays.

In some embodiments, the backlight unit 220 may also be divided into a plurality of blocks 221 in the m×n array, which correspond to the regions 211, respectively. In this case, the blocks 221 existing in the same row in the m×n array may be referred to as a block row, and the blocks 221 existing in the same column may be referred to as a block column. Each block 221 may include a plurality of LEDs 222 and operate as a light source of a corresponding region 211. The LEDs 222 of each block 221 may be driven by a backlight driver (e.g., 160 in FIG. 1) to emit light with the brightness of the corresponding region 211.

Figure 3:
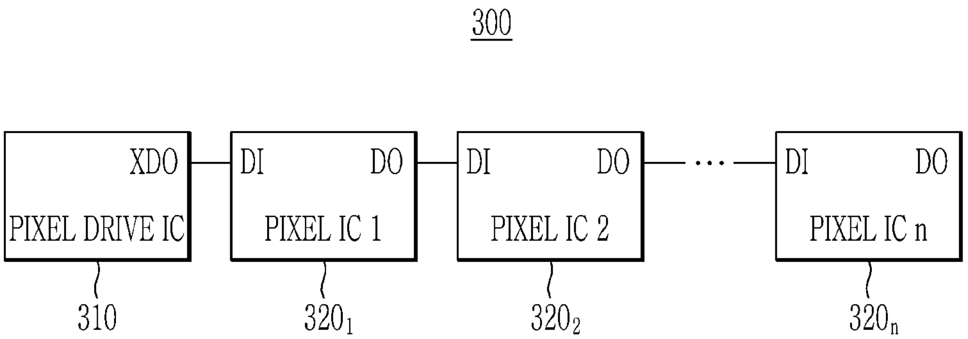
FIG. 3 is a diagram illustrating an example of a backlight driver according to some embodiments.
Figure 4:
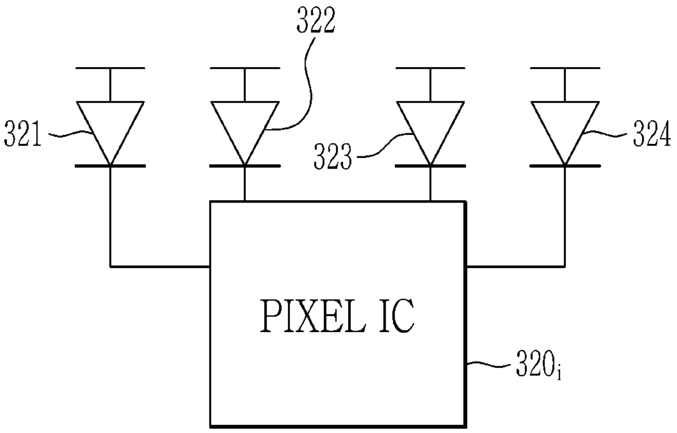
FIG. 4 is a diagram illustrating an example of LEDs driven by a pixel IC shown in FIG. 3.
Figure 5:
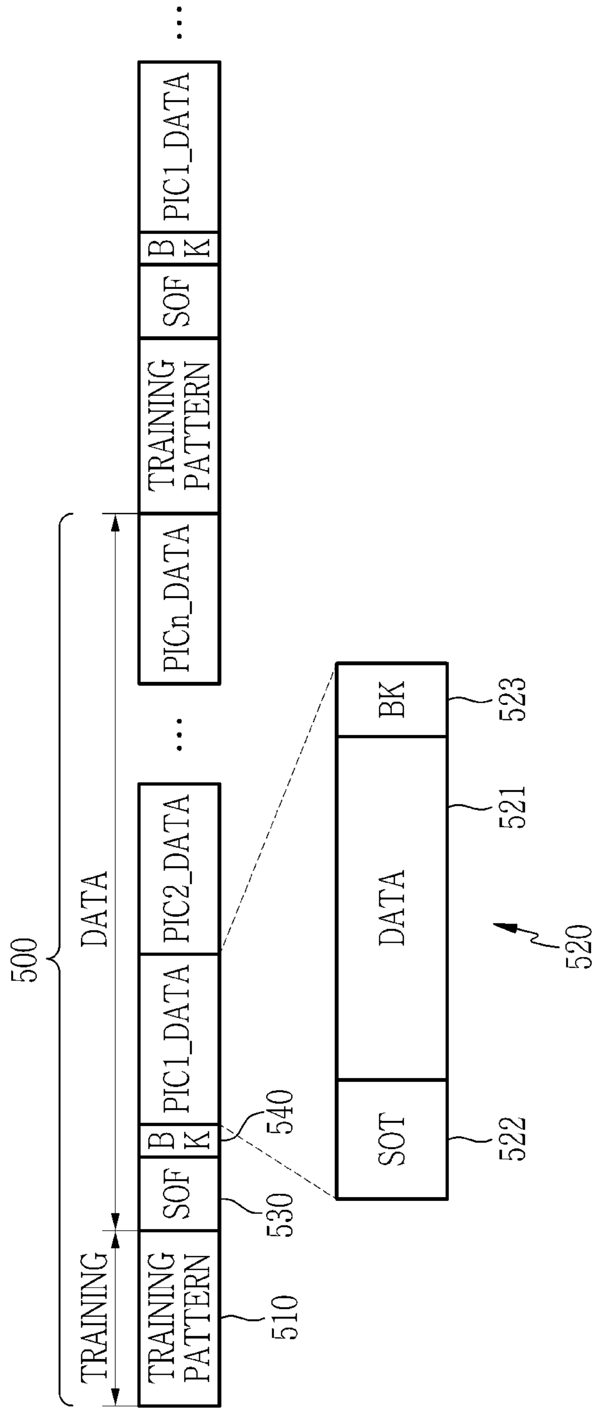
FIG. 5 is a diagram illustrating a backlight driver according to some embodiments.
Figure 6:
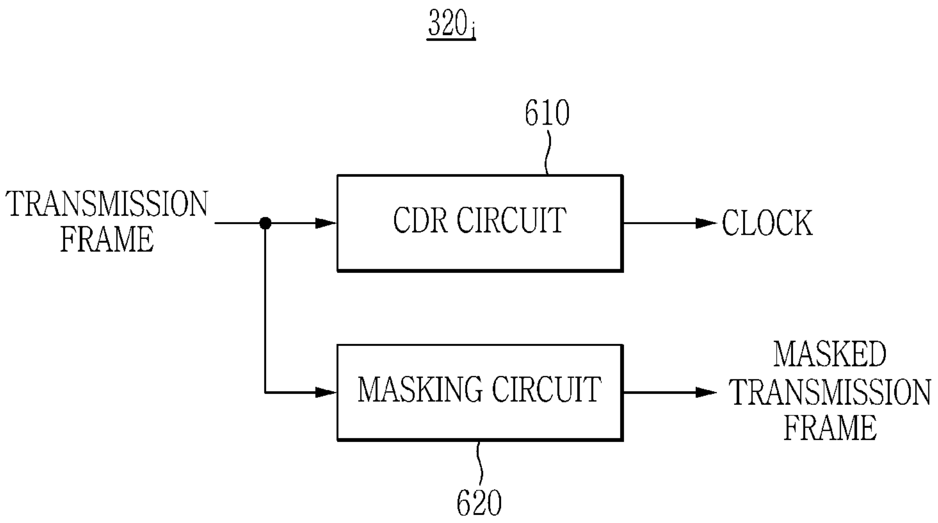
FIG. 6 is a diagram illustrating an example of a pixel IC shown in FIG. 3.

FIG. 3 is a diagram illustrating an example of a backlight driver according to some embodiments, FIG. 4 is a diagram illustrating an example of LEDs driven by a pixel IC shown in FIG. 3, FIG. 5 is a diagram illustrating a backlight driver according to some embodiments, and FIG. 6 is a diagram illustrating an example of a pixel IC shown in FIG. 3.

Referring to FIG. 3, a backlight driver 300 may include a master driving circuit 310 and a plurality of slave driving circuits $\mathbf{320}_1$, $\mathbf{320}_2$, . . . $\mathbf{320}_n$. In an example embodiment, the backlight driver 300 may serve as the backlight driver 160 shown in and described with reference to FIG. 1. The master driving circuit 310 may be referred to as a "pixel driving circuit", and the slave driving circuit $\mathbf{320}_i$ may be referred to as a "pixel circuit". Here, i is an integer between 1 and n. When the pixel driving circuit 310 and the pixel circuit $\mathbf{320}_i$ are provided as integrated circuits (ICs), the master driving circuit 310 and the slave driving circuit $\mathbf{320}_i$ may be referred to as a "pixel driving IC" and a "pixel IC", respectively. Hereinafter, for convenience, the master driving circuit is described as a pixel driving IC, and the slave driving circuit is described as a pixel IC.

As shown in FIG. 4, each pixel IC $\mathbf{320}_i$ may correspond to some LEDs 321, 322, 323, and 324 among a plurality of LEDs included in a backlight unit and may drive the corresponding LEDs 321 to 324. Although it is shown in FIG. 4 that the pixel IC $\mathbf{320}_i$ drives four LEDs 321 to 324, the number of LEDs driven by the pixel IC $\mathbf{320}_i$ is not limited thereto. In some embodiments, the pixel ICs $\mathbf{320}_1$ to $\mathbf{320}_n$ may correspond to a plurality of blocks (e.g., 221 in FIG. 2) of the backlight unit, respectively, and drive the LEDs of the corresponding block. In some embodiments, the pixel ICs $\mathbf{320}_1$ to $\mathbf{320}_n$ correspond to a plurality of blocks 221 existing in one block row in the backlight unit, respectively. In some embodiments, the pixel ICs $\mathbf{320}_1$ to $\mathbf{320}_n$ may correspond to a plurality of blocks 221 existing in one block column in the backlight unit, respectively. In some embodiments, the pixel ICs $320_1$ to $320_n$ may correspond to a plurality of blocks 221 existing in two or more block rows or two or more block columns in the backlight unit, respectively.

The pixel driving IC 310 may generate a plurality of data respectively corresponding to the pixel ICs $320_1$ to $320_n$. Each data may be brightness data indicating brightness to be emitted by the LEDs driven by the corresponding pixel IC $320_i$. In some embodiments, the pixel driving IC 310 may generate the data based on luminance data LDT received from a timing controller (e.g., 110 in FIG. 1). In some embodiments, the pixel driving IC 310 may determine luminance of an image corresponding to each block based on the luminance data LDT, and generate the data of the pixel IC $320_i$ corresponding to the corresponding block so that the LEDs of the corresponding block emit light with brightness corresponding to the determined luminance.

Referring to FIG. 3 again, the pixel ICs $320_1$ to $320_n$ may be connected in a daisy chain structure. That is, an input terminal (for example, a Digital Input DI) of the $(i+1)^{th}$ pixel IC $320_{i+1}$ may be connected to an output terminal (for example, a Digital Output DO) of the $i^{th}$ pixel IC 320*i*. In this case, an input terminal DI of the first pixel IC $320_1$ may be connected to an output terminal XDO of the pixel driving IC 310, and an output terminal DO of the last pixel IC $320_n$ may not be connected to an input terminal DI of another pixel IC. Accordingly, the pixel driving IC 310 may transfer a transmission frame including a plurality of data corresponding to the pixel ICs $320_1$ to $320_n$ to the first pixel IC $320_1$ among the pixel ICs $320_1$ to $320_n$, and each pixel IC 320*i* may transfer the received transmission frame to a next pixel IC $320_{i+1}$.

Referring to FIG. 3 and FIG. 5, the pixel driving IC 310 may transfer a transmission frame 500 to the first pixel IC $320_1$. The transmission frame 500 may include a training period and a data period. The training period may include a clock training pattern 510, and the data period may include a plurality of data packets PIC1_DATA to PICn_DATA. The clock training pattern 510 may be a data pattern for a clock and data recovery (CDR) process. In some embodiments, the data period may further include a clock pattern for recovering a clock so that the clock can be recovered even in the data period. The clock pattern may be included between data bits in the data packets PIC1_DATA to PICn_DATA. As such, the transmission frame 500 may be provided as a clock embedded signal. In this case, an oscillator for clock generation may be removed from each pixel IC 320*i*, though embodiments are not limited thereto. In other embodiments, an oscillator for clock generation may be included in each pixel IC 320*i*.

The data packets PIC1_DATA to PICn_DATA may correspond to the pixel ICs $320_1$ to $320_n$, respectively, and include data, for example, brightness data of LEDs driven by the corresponding pixel IC. The data packets PIC1_DATA to PICn_DATA may be arranged in the transmission frame 500 in the connection order of the pixel ICs $320_1$ to $320_n$ connected in the daisy chain structure.

Each data packet 520 may include data 521 of LEDs driven by a corresponding pixel IC 320*i*. In some embodiments, each data packet 520 may further include a start of transmission (SOT) pattern 522 located before the data 521. The SOT pattern 522 may indicate a start of the corresponding data packet 520. In some embodiments, a blank (BK) 523 may be located at an end of each data packet 520.

In some embodiments, the transmission frame 500 may further include a start of frame (SOF) pattern 530 between the clock training pattern 510 and the first data packet PIC1_DATA. The SOF pattern 530 may indicate a start of the data period in the transmission frame 500. In some embodiments, a blank 540 may exist between the SOF pattern 530 and the first data packet PIC1_DATA.

In some embodiments, the data 521 of the data packet 520 may include a plurality of fields that correspond to a plurality of LEDs driven by the corresponding pixel IC $320_i$, respectively. Each field may include data bits indicating brightness of a corresponding LED among the LEDs.

Referring to FIG. 6, in some embodiments, each pixel IC $320_i$ may include a CDR circuit 610 and a masking circuit 620.

Referring to FIG. 5 and FIG. 6, each pixel IC $320_i$ may receive the transmission frame 500 in the daisy chain structure. The first pixel IC $320_1$ may receive the transmission frame 500 transferred from the pixel driving IC (310 in FIG. 3), and the remaining pixel ICs $320_i$ may receive the transmission frame 500 from a previous pixel IC $320_{i-1}$. The previous pixel IC $320_{i-1}$ may indicate a pixel IC $320_{i-1}$ connected in an input of the corresponding pixel IC $320_i$ in the daisy chain structure, that is, a pixel IC $320_{i-1}$ whose output terminal DO is connected to an input terminal DI of the corresponding pixel IC 320*i*.

The CDR circuit 610 may recover a clock by performing a CDR process on the clock training pattern 510 of the received transmission frame 500. In some embodiments, the CDR circuit 610 may recover the clock by performing the CDR process on a clock pattern included in the data period of the transmission frame 500. Accordingly, in an embodiment, the pixel IC $320_i$ may operate based on the recovered clock.

The masking circuit 620 may mask at least a part of its own data packet in the received transmission frame 500 with a masking pattern. In some embodiments, a transmission frame 500 received by the pixel IC $320_i$ may be a transmission frame 500 in which data packets corresponding to the pixel ICs $320_1$ to $320_{i-1}$ are masked. In some embodiments, when masking at least a part of its own data packet with the masking pattern, the masking circuit 620 may mask data packets corresponding to the pixel ICs $320_1$ to $320_{i-1}$ again.

The masking circuit 620 may transfer the masked transmission frame 500 to a next pixel IC $320_{i+1}$. The next pixel IC $320_{i+1}$ may indicate a pixel IC $320_{i+1}$ connected an output of the corresponding pixel IC $320_i$ in the daisy chain structure, that is, a pixel IC $320_{i+1}$ whose input terminal DI is connected to an output terminal DO of the corresponding pixel IC $320_i$. In this case, the masking circuit 620 may bypass the clock training pattern 510 and a data period after its own data packet and transfer them to the next pixel IC $320_{i+1}$.

Next, an operation of a backlight driver according to various embodiments is described with reference to FIG. 7 to FIG. 9.

Figure 7:
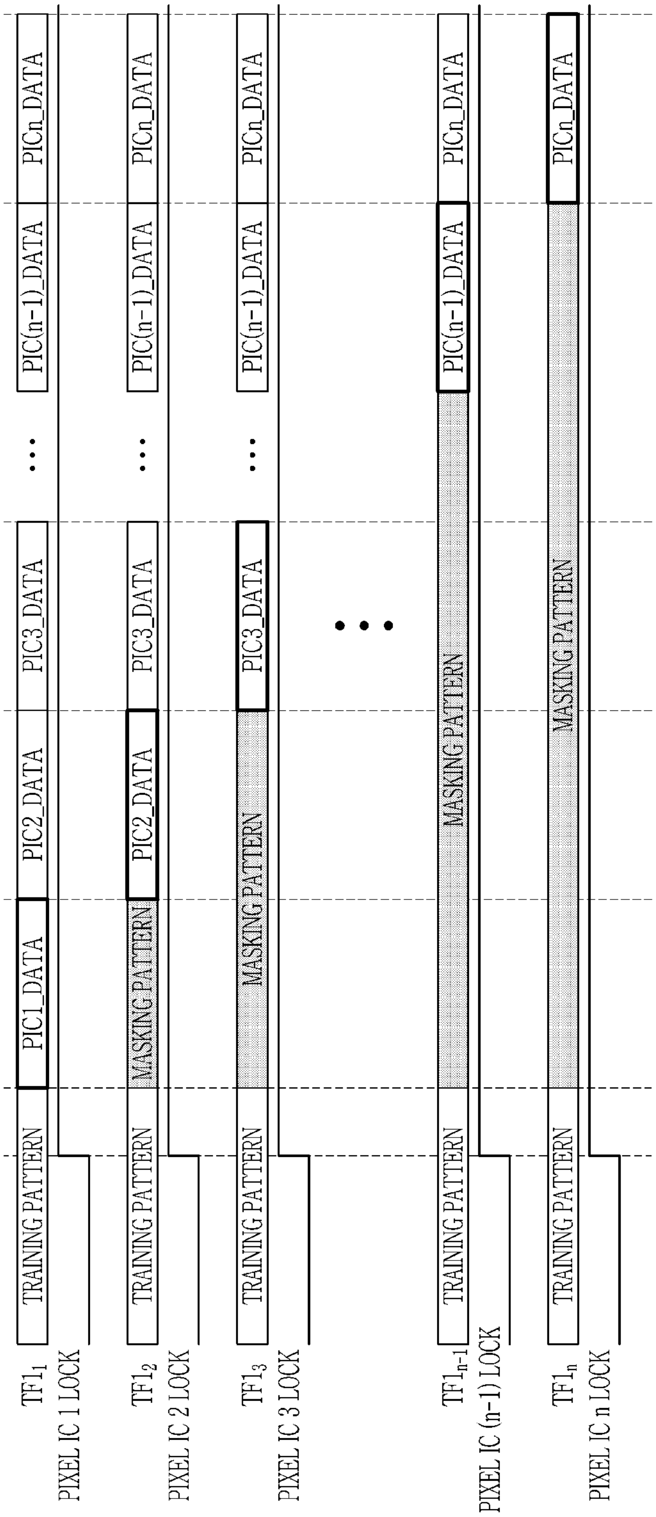
FIG. 7, FIG. 8, and FIG. 9 each are a diagram illustrating an example of an operation of a backlight driver according to some embodiments.

FIG. 7 is a diagram illustrating an example of an operation of a backlight driver according to some embodiments.

Referring to FIG. 3 and FIG. 7, a pixel IC $320_i$ may receive a transmission frame $TF1_i$ from a previous pixel IC $320_{i+1}$ through an input terminal DI, and transfer a transmission frame $TF1_{i+1}$ to a next pixel IC $320_{i+1}$ through an output terminal DO. In this case, the first pixel IC $320_1$ may receive a transmission frame $TF1_i$ from a pixel driving IC 310, and the last pixel IC $320_n$ may not transfer a transmission frame $TF1_n$.

The pixel IC $320_i$ may bypass a clock training pattern of the received transmission frame $TF1_i$ to the next pixel IC $320_{i+1}$. The pixel IC $320_i$ may perform a CDR process to recover a clock based on the clock training pattern. In some embodiments, the pixel IC $320_i$ may detect a frequency based on the clock training pattern, lock the detected frequency, and recover the clock. Because the clock training pattern is transferred to a plurality of pixel ICs $320_1$ to $320_n$ through the bypass, the pixel ICs $320_1$ to $320_n$ may simultaneously recover the clock based on the clock training pattern.

The pixel IC $320_i$ may mask at least a part of its own data packet PICi_DATA in the received transmission frame $TF1_i$, and transfer the masked transmission frame $TF1_{i+1}$ to the next pixel IC $320_{i+1}$.

The first pixel IC $320_i$ of the daisy chain structure may receive a data packet PIC1_DATA after the clock training pattern. The pixel IC $320_1$ may receive the first data packet (i.e., a beginning data packet) PIC1_DATA among a plurality of data packets PIC1_DATA to PICn_DATA after the clock training pattern as its own data packet. The pixel IC $320_1$ may transfer the transmission frame $TF1_2$ in which at least a part of its own data packet PIC1_DATA is masked with a masking pattern to the next pixel IC $320_2$.

The second pixel IC $320_2$ may receive the masked transmission frame $TF1_2$ from the previous pixel IC $320_1$. Since the data packet PIC1_DATA is masked in the masked transmission frame $TF1_2$, the second data packet PIC2_DATA of the original transmission frame $TF1_1$ may be the first data packet of the masked transmission frame $TF1_2$. Accordingly, the pixel IC $320_2$ may receive the first data packet PIC2_DATA of the masked transmission frame $TF1_2$ as its own data packet. The pixel IC $320_2$ may transfer the transmission frame $TF1_3$ in which at least a part of its own data packet PIC2_DATA is masked with a masking pattern in the masked transmission frame $TF1_2$ to the next pixel IC $320_3$.

In this way, the $i^{th}$ pixel IC $320_i$ may receive the masked transmission frame $TF1_i$ from the $(i-1)^{th}$ pixel IC $320_{i-1}$. Because the first to $(i-1)^{th}$ data packets PIC1_DATA to PIC(i−1)_DATA are masked in the masked transmission frame $TF1_i$, the $i^{th}$ data packet PICi_DATA of the original transmission frame $TF1_1$ may be the first data packet (beginning data packet) of the masked transmission frame $TF1_i$. Accordingly, the pixel IC $320_i$ may receive the first data packet PICi_DATA of the masked transmission frame $TF1_i$ as its own data packet. The pixel IC $320_i$ may output the transmission frame $TF1_{i+1}$ in which at least a part of its own data packet PICi_DATA is masked with a masking pattern in the masked transmission frame $TF1_i$ to the next pixel IC $320_{i+1}$.

In some embodiments, the pixel IC $320_i$ may mask the whole of the data packet PICi_DATA of the pixel IC $320_i$ with the masking pattern. In some embodiments, the pixel IC $320_i$ may mask a part of its own data packet PICi_DATA with the masking pattern. In this case, the part masked in the data packet PICi_DATA may include an SOT pattern (e.g., 522 of FIG. 5) of the data packet PICi_DATA.

In some embodiments, the pixel IC $320_i$ may identify the start of a data period based on an SOF pattern (e.g., 530 in FIG. 5), identify the start of the data packet based on the SOT pattern 522, and identify the end of the data packet based on a blank 523 after the SOT pattern 522 or the next SOT pattern 522. In some embodiments, since the SOT patterns 522 of the first to $(i-1)^{th}$ data packets PIC1_DATA to PIC(i−1)_DATA are masked in the transmission frame $TF1_i$ received by the pixel IC $320_i$, the pixel IC $320_i$ may identify the start of its own data packet PICi_DATA based on the first SOT pattern 522 that is not masked in the transmission frame $TF1_i$.

As described above, because the backlight driver 300 uses the masking pattern, even if there is no identification information for identifying the pixel IC corresponding to the data packet or information indicating the order of the data packets, each pixel IC $320_i$ may identify its own data packet PICi_DATA so that a size of the transmission frame may be reduced. In addition, since, in an embodiment, there is no need to transmit clocks to all pixel ICs by using an embedded clock signal, high electromagnetic interference (EMI) that may be caused by having clocks transmitted to all pixel ICs may be prevented.

Figure 8:
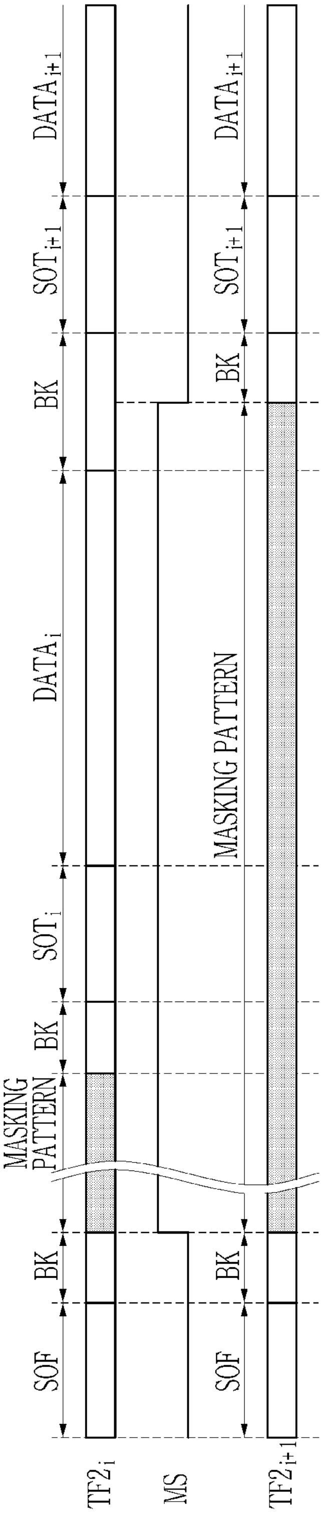

FIG. 8 is a diagram illustrating an example of an operation of a backlight driver according to some embodiments.

Referring to FIG. 3 and FIG. 8, a pixel IC $320_i$ may wait to receive a data packet when receiving an SOF pattern in a transmission frame $TF2_i$. The pixel IC $320_i$ may start masking by setting a masking signal MS to a first level (or a predetermined level) after the SOF pattern. In some embodiments, the pixel IC $320_i$ may set the masking signal MS to the first level in a blank field BK after the SOF pattern. The first level may be, for example, a high level ('1') as a logic level. When the masking signal MS reaches the first level, the pixel IC $320_i$ starts masking the transmission frame $TF2_i$, and accordingly, may output the masked transmission frame $TF2_{1+1}$. In some embodiments, when the masking signal MS is set to the first level, the pixel IC $320_i$ may output the masked transmission frame $TF2_{i+1}$ by outputting the masking pattern instead of the transmission frame $TF2_i$.

When an SOT pattern SOTi is input in the transmission frame $TF2_i$, the pixel IC $320_i$ may receive the SOT pattern SOTi and data DATAi following the SOT pattern SOTi as its own data packet. When the data DATAi of the data packet ends, the pixel IC $320_i$ may set the masking signal MS to a second level. In some embodiments, the pixel IC $320_i$ may set the masking signal MS to the second level in the blank BK after the data DATAi. The second level may be, for example, a low level ('0') as a logic level. When the masking signal MS reaches the second level, the pixel IC $320_i$ may end masking and output the transmission frame $TF2_i$ as the transmission frame $TF2_{i+1}$. In this way, the pixel IC $320_i$ may mask a period (hereinafter referred to as a "masking period") from after the SOF pattern to the data DATAi of its own data packet.

Since the first data packet to the $i^{th}$ data packet in the transmission frame $TF2_{i+1}$ have been masked with the masking pattern by the masking signal MS, the next pixel IC $320_{i+1}$ may receive the first SOT pattern, i.e., an SOT pattern $SOT_{i+1}$ of the $(i+1)^{th}$ data packet and data $DATA_{i+1}$ following the SOT pattern $SOT_{i+1}$ as its own data packet in the transmission frame $TF2_{i+1}$. Further, as described above, the pixel IC $320_{i+1}$ may output the transmission frame masked with the masking pattern during a period from after the SOF pattern to the data $DATA_{i+1}$.

As described above, each pixel IC $320_i$ may receive its own data packet without identification information by receiving the data $DATA_i$ following the first unmasked SOT pattern $SOT_i$ as its own data. Further, each pixel IC $320_i$ may efficiently control masking by starting masking based on the SOF pattern and ending masking after the data $DATA_i$ following the first SOT pattern $SOT_i$.

Figure 9:
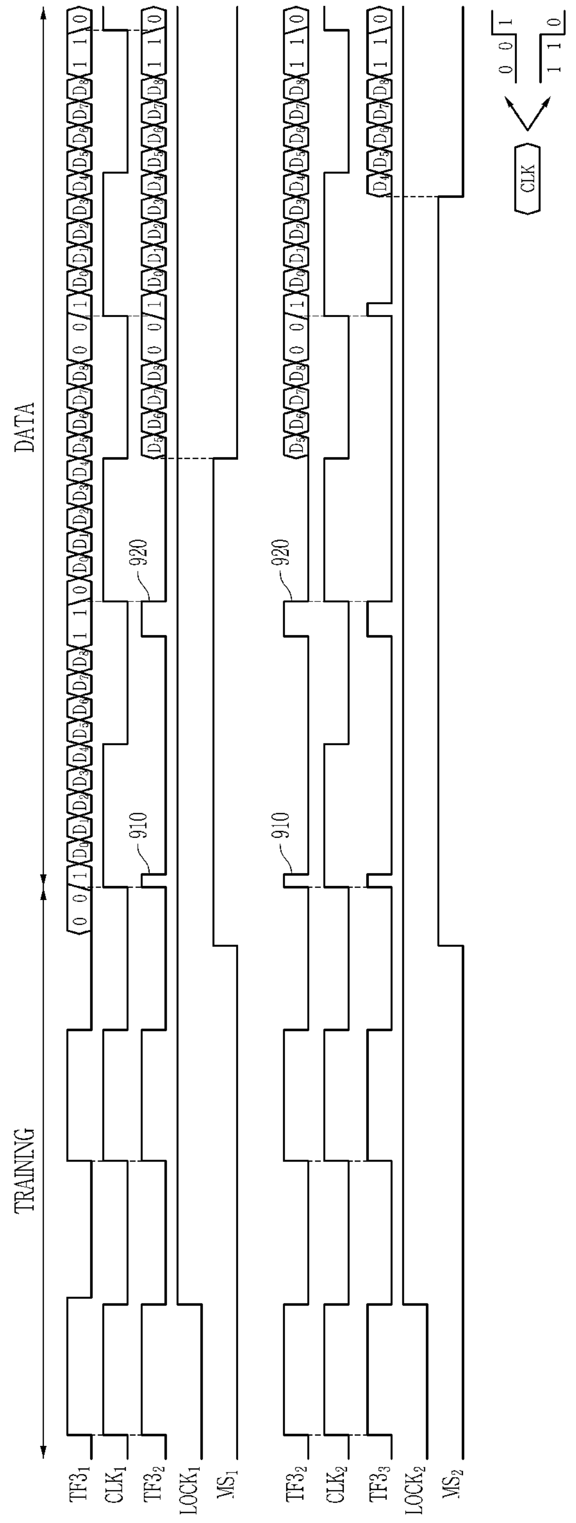

FIG. 9 is a diagram illustrating an example of an operation of a backlight driver according to some embodiments. For convenience, FIG. 9 shows inputs and outputs of pixel ICs $320_1$ and $320_2$ shown in FIG. 3.

Referring to FIG. 3 and FIG. 9, a transmission frame $TF3_1$ input to an input terminal of the pixel IC $320_1$ may include a training period and a data period. The training period may include a clock training pattern, and the clock training pattern may be a pattern having a first level and a second level alternately in synchronization with a frequency of a clock. The first level may be a high level ('1') as a logic level, and the second level may be a low level ('0') as the logic level. The pixel IC 320$_1$ may lock a frequency of a clock $CLK_1$ based on the clock training pattern (LOCK1). Further, the pixel IC 320$_1$ may bypass the clock training pattern and output it as a transmission frame $TF3_2$.

A plurality of data packets respectively corresponding to a plurality of pixel ICs 320$_1$ to 320$_n$ may be transmitted in the data period. The data period may include a clock pattern and data. The clock pattern may repeat every cycle of the clock, and may have a pattern in which an edge of the clock can be identified. For example, FIG. 9 shows the clock pattern as a pattern of "001" or "110" and the data as $D_0$, $D_1$ . . . $D_8$. Therefore, in an embodiment, the pixel IC 320$_1$ may recover the clock $CLK_1$ by detecting a timing at which a bit value transitions in the clock pattern in the form of an edge (e.g., a rising edge) of the clock $CLK_1$ based on the frequency locked by the clock training pattern.

The pixel IC 320$_1$ may receive its own data packet in the data period, set a masking signal $MS_1$ to a predetermined level to mask a period (i.e., create a masking period) corresponding to its own data packet in the data period, and output the masked transmission frame $TF3_2$ through an output terminal. When a clock pattern is included in the masking period, the pixel IC 320$_1$ may not mask a region corresponding to the edge of the clock. That is, the pixel IC 320$_1$ may stop masking in the region corresponding to the edge of the clock. In some embodiments, as shown in FIG. 9, the pixel IC 320$_1$ may not mask the regions corresponding to the edges of the clock by generating pulses 910 and 920 in the regions corresponding to the edges of the clock and outputting the pulses 910 and 920. In some embodiments, unlike FIG. 9, the pixel IC 320$_1$ may not mask the regions corresponding to the edges of the clock by outputting the clock pattern without modification instead of generating the pulses 910 and 920.

The next pixel IC 320$_2$ may receive the transmission frame $TF3_2$ transferred through the output terminal of the pixel IC 320$_1$ through an input terminal. The pixel IC 320$_2$ may lock a frequency of a clock $CLK_2$ based on the clock training pattern of the transmission frame $TF3_2$ ($LOCK_2$) and output the clock training pattern through an output terminal. Further, the pixel IC 320$_2$ may recover the clock $CLK_2$ by detecting a timing at which a bit value transitions in the clock pattern as an edge (e.g., rising edge) of the clock $CLK_2$ based on the frequency locked by the clock training pattern. In some embodiments, the pixel IC 320$_2$ may recover the clock $CLK_2$ by detecting the edge of the clock $CLK_2$ based on the pulses 910 and 920 of the regions corresponding to the edges of the clock.

The pixel IC 320$_2$ may receive its own data packet in the data period of the transmission frame, set the masking signal $MS_2$ to the predetermined level to mask a period (masking period) corresponding to its own data packet, and output the masked transmission frame $TF3_3$ through an output terminal. When the clock pattern is included in the masking period, the pixel IC 320$_2$ may not mask a region corresponding to the edge of the clock. That is, the pixel IC 320$_2$ may stop masking in the region corresponding to the edge of the clock.

As such, each pixel IC 320$_i$ may mask at least a part of the masking period. Because each pixel IC 320$_i$ masks its own data packet, the next pixel IC 320$_{i+1}$ may receive the first data packet as its own data packet in the transmission frame $TF1_{i+1}$. Further, each pixel IC 320$_i$ may not mask the region corresponding to the edge of the clock in the clock pattern during the masking period. Accordingly, the next pixel IC 320$_{i+1}$ may also recover the clock based on the edge of the clock.

Figure 10:
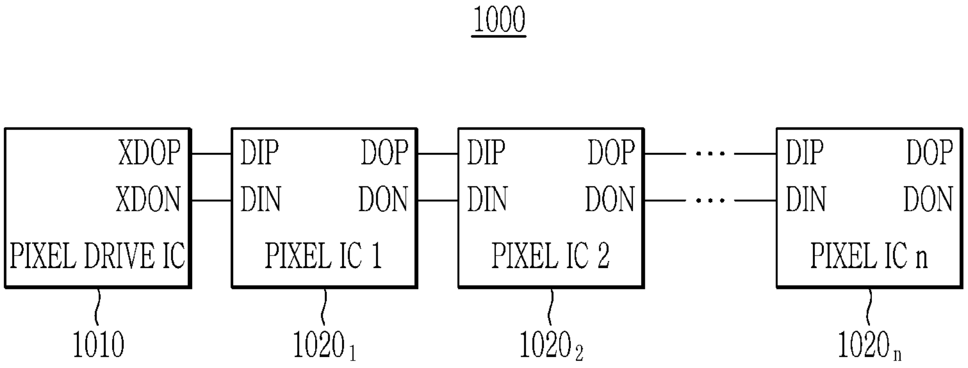
FIG. 10 is a diagram illustrating an example of a backlight driver according to some embodiments.

FIG. 10 is a diagram illustrating an example of a backlight driver according to some embodiments.

A transmission frame may be transferred as a differential signal. In this case, as shown in FIG. 10, in a backlight driver 1000, an output terminal of a pixel driving IC 1010 may include a first output terminal XDOP and a second output terminal XDON that can output a differential signal. An input terminal of each pixel IC 1020$_i$ may include a first input terminal DIP and a second input terminal DIN that can receive a differential signal, and an output terminal of each pixel IC 1020$_i$ may include a first output terminal DOP and a second output terminal DON that can output a differential signal. The first input terminal DIP and the second input terminal DIN may be referred to as a positive input terminal and a negative input terminal, respectively, and the first output terminal XDOP or DOP and the second output terminal XDON or DON may be referred to as a positive output terminal and a negative output terminal, respectively.

A plurality of pixel ICs 1020$_1$ to 1020$_n$ may be connected in a daisy chain structure. That is, the input terminals DIP and DIN of the $(i+1)^{th}$ pixel IC 1020$_{i+1}$ may be connected to the output terminals DOP and DON of the $i^{th}$ pixel IC 1020$_i$, respectively. In this case, the input terminals DIP and DIN of the first pixel IC 1020$_1$ may be connected to the output terminals XDOP and XDON of the pixel driving IC 1010, respectively, and the output terminals DOP and DOP of the last pixel IC 1020$_n$ may not be connected to the input terminals DIP and DIN of another pixel IC.

Figure 11:
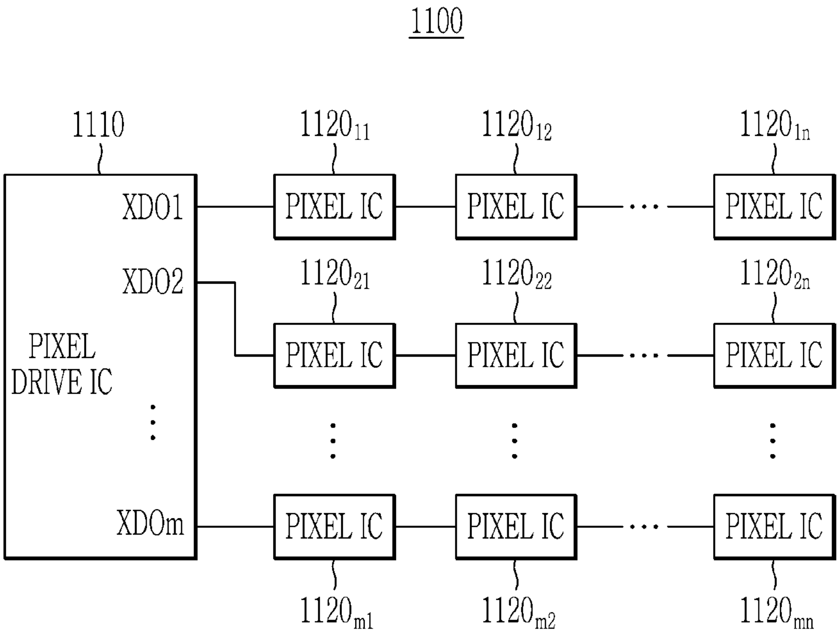
FIG. 11 is a diagram illustrating an example of a backlight driver according to some embodiments.

FIG. 11 is a diagram illustrating an example of a backlight driver according to some embodiments.

Referring to FIG. 11, a backlight driver 1100 may include a pixel driving IC 1110 and a plurality of pixel ICs 1120$_{11}$, 1120$_{12}$ . . . 1120$_{1n}$, 1120$_{21}$, 1120$_{22}$ . . . 1120$_{2n}$ . . . 1120$_{m1}$, 1120$_{m2}$ . . . 1120$_{mn}$.

The pixel ICs 1120$_{11}$ to 1120$_{mn}$ may be divided into a plurality of pixel IC groups, and the $j^{th}$ pixel IC group may include a plurality of pixel ICs 1120$_{j1}$ to 1120$_{jn}$ connected in a daisy chain structure. Here, j is an integer between 1 and m. That is, the pixel ICs 1120$_{11}$ to 1120$_{1n}$ connected in the daisy chain structure may form the first pixel IC group, the pixel ICs 1120$_{21}$ to 1120$_{2n}$ connected in the daisy chain structure may form the second pixel IC group, and the pixel ICs 1120$_{m1}$ to 1120$_{mn}$ connected in the daisy chain structure may form an $m^{th}$ pixel IC group. In some embodiments, the pixel ICs 1120$_{j1}$ to 1120$_{jn}$ of the $j^{th}$ pixel IC group may correspond to a plurality of blocks (221 in FIG. 2) existing in the $j^{th}$ block row in an m×n array shown in FIG. 2, respectively.

The pixel driving IC 1110 may have a plurality of output terminals XDO1, XDO2 . . . XDOm. Each output terminal XDOj may be connected to the first pixel IC 1120$_{j1}$ among the pixel ICs 1120$_{j1}$ to 1120$_{jn}$ included in a corresponding pixel IC group among the plurality of pixel IC groups. The pixel driving IC 1110 may generate a plurality of transmission frames respectively corresponding to the plurality of pixel IC groups, and transfer each transmission frame to a corresponding one of the pixel IC groups **1120*j*1 to 1120*jn*** through a corresponding output terminal XDOj.

As described above, the pixel driving IC may control a plurality of LEDs included in the plurality of blocks of the backlight unit.

Figure 12:
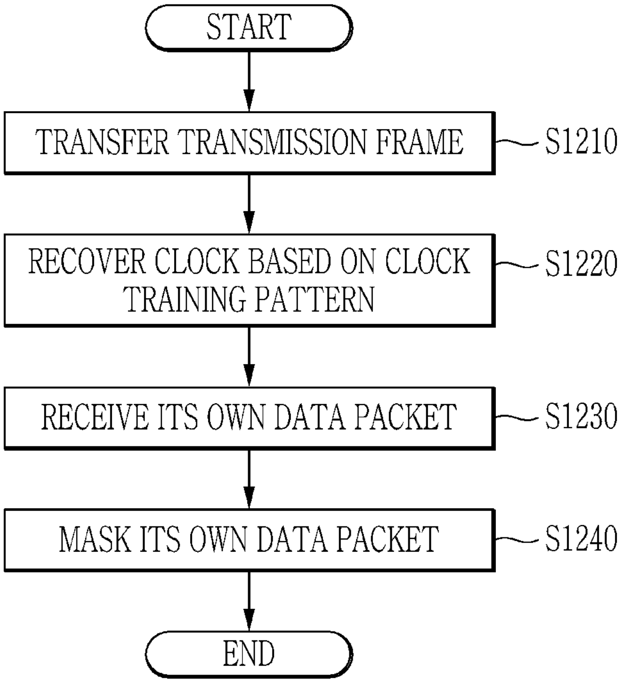
FIG. 12 is a flowchart illustrating an example of an operation of a backlight apparatus according to some embodiments.

FIG. 12 is a flowchart illustrating an example of an operation of a backlight apparatus according to some embodiments.

Referring to FIG. 12, a pixel driving IC in a backlight apparatus may generate a transmission frame at S1210. The transmission frame may include a training period including a clock training pattern and a data period including a plurality of data packets. The data packets may correspond to a plurality of pixel ICs connected to the pixel driving IC in a daisy chain structure, respectively. The pixel driving IC may transfer the transmission frame to the pixel ICs connected in the daisy chain structure at S1210.

Each pixel IC may recover a clock by performing a CDR process on the clock training pattern of the training period at S1220. Each pixel IC may receive the first unmasked data packet in the data period as its own data packet at S1230. Each pixel IC may drive LEDs connected to the corresponding pixel IC based on data included in its own data packet. Each pixel IC may mask at least a part of its own data packet at S1240. Accordingly, the pixel IC may receive from a previous pixel IC a transmission frame in which a data packet of the previous pixel IC is masked.

In some embodiments, each of the components, elements, modules, or units represented by a block may be implemented as various numbers of hardware, software, and/or firmware structures that execute respective functions described above, according to embodiments. For example, at least one of these components, elements, modules, or units may include various hardware components including a digital circuit, a programmable or non-programmable logic device or array, an application specific integrated circuit (ASIC), or other circuitry using a digital circuit structure, such as a memory, a processor, a logic circuit, a look-up table, etc., that may execute the respective functions through controls of one or more microprocessors or other control apparatuses. Further, at least one of these components, elements, modules, or units may include a module, a program, or a part of code, which contains one or more executable instructions for performing specified logic functions, and executed by one or more microprocessors or other control apparatuses. Furthermore, at least one of these components, elements, modules, or units may further include or may be implemented by a processor such as a central processing unit (CPU) that performs the respective functions, a microprocessor, or the like. Functional aspects of embodiments may be implemented in algorithms that execute on one or more processors.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A backlight apparatus comprising:

a plurality of blocks, each of the plurality of blocks comprising a plurality of light emitting elements;

a master driving circuit configured to generate a transmission frame comprising a training period and a data period, the training period comprising a clock training pattern, and the data period comprising a plurality of data packets respectively corresponding to the plurality of blocks; and a plurality of slave driving circuits respectively corresponding to the plurality of blocks and connected to the master driving circuit in a daisy chain structure, each of the plurality of slave driving circuits configured to:

receive the transmission frame through the daisy chain structure, recover a clock based on the clock training pattern, drive the plurality of light emitting elements in a corresponding block among the plurality of blocks based on its own data packet among the plurality of data packets, and transfer a masked frame obtained by masking at least a portion of the data period as the transmission frame of a next slave driving circuit among the plurality of slave driving circuits.

2. The backlight apparatus of claim 1, wherein the data period further comprises a clock pattern, and wherein each of the plurality of slave driving circuits is further configured to recover the clock in the data period based on the clock pattern.

3. The backlight apparatus of claim 2, wherein each of the plurality of slave driving circuits is further configured to recover the clock based on the clock training pattern and the clock pattern without using an oscillator.

4. The backlight apparatus of claim 1, wherein each of the plurality of slave driving circuits is further configured to obtain the masked frame by masking at least a part of its own data packet in the transmission frame received through the daisy chain structure.

5. The backlight apparatus of claim 4, wherein each of the plurality of slave driving circuits is further configured to receive a beginning data packet that is not masked in the transmission frame received through the daisy chain structure, as its own data packet.

6. The backlight apparatus of claim 4, wherein each of the plurality of data packets comprises a start of transmission pattern indicating a start of a corresponding data packet among the plurality of data packets and data following the start of transmission pattern, and wherein the at least a part of its own data packet comprises the start of transmission pattern.

7. The backlight apparatus of claim 1, wherein the data period further comprises a start of frame pattern indicating a start of the data period, and wherein each of the plurality of data packets comprises a start of transmission pattern indicating a start of a corresponding data packet among the plurality of data packets and data following the start of transmission pattern.

8. The backlight apparatus of claim 7, wherein each of the plurality of slave driving circuits is further configured to obtain the masked frame by masking at least a part of a masking period, the masking period being a period from after the start of frame pattern of the transmission frame received through the daisy chain structure to the data of its own data packet.

9. The backlight apparatus of claim 8, wherein each of the plurality of slave driving circuits is further configured to receive, as its own data packet, a data packet, among the plurality of data packets, comprising the start of transmission pattern that is first detected in the transmission frame received through the daisy chain structure.

10. The backlight apparatus of claim 8, wherein the data period further comprises a clock pattern, and wherein each of the plurality of slave driving circuits is further configured to not mask a region corresponding to an edge of the clock in the clock pattern of the masking period.

11. The backlight apparatus of claim 7, wherein each of the plurality of slave driving circuits is further configured to:

set a masking signal to a first level after the start of frame pattern of the transmission frame received through the daisy chain structure;

set the masking signal to a second level after the data packet;

start masking the transmission frame received through the daisy chain structure in response to the first level of the masking signal; and end masking the transmission frame received through the daisy chain structure in response to the second level of the masking signal.

12. The backlight apparatus of claim 11, wherein the data period further comprises a clock pattern, and wherein each of the plurality of slave driving circuits is further configured to stop the masking in a region corresponding to an edge of the clock in the clock pattern.

13. A backlight apparatus comprising:

a plurality of blocks, each of the plurality of blocks comprising a plurality of light emitting elements;

a master driving circuit configured to generate a transmission frame comprising a data period comprising a plurality of data packets respectively corresponding to the plurality of blocks, and a training period comprising a clock training pattern; and a plurality of slave driving circuits respectively corresponding to the plurality of blocks and connected to the master driving circuit in a daisy chain structure, each of the plurality of slave driving circuits configured to:

receive the transmission frame through the daisy chain structure, transfer a frame obtained by masking at least a part of its own data packet in the transmission frame received through the daisy chain structure as the transmission frame of a next slave driving circuit among the plurality of slave driving circuits, and drive the plurality of light emitting elements in a corresponding block among the plurality of blocks based on its own data packet among the plurality of data packets.

14. The backlight apparatus of claim 13, wherein each of the plurality of slave driving circuits is further configured to receive a beginning data packet that is not masked in the transmission frame received through the daisy chain structure as its own data packet.

15. The backlight apparatus of claim 13, wherein the data period further comprises a start of frame pattern indicating a start of the data period, and wherein each of the plurality of data packets comprises a start of transmission pattern indicating a start of a corresponding data packet and data following the start of transmission pattern.

16. The backlight apparatus of claim 15, wherein each of the plurality of slave driving circuits is further configured to mask at least a part of a masking period from after the start of frame pattern of the transmission frame received through the daisy chain structure to the data of its own data packet.

17. The backlight apparatus of claim 16, wherein each of the plurality of slave driving circuits is further configured to receive, as its own data packet, a data packet, among the plurality of data packets, comprising the start of transmission pattern that is first detected in the transmission frame received through the daisy chain structure.

18. The backlight apparatus of claim 16, wherein the data period further comprises a clock pattern, and wherein each of the plurality of slave driving circuits is further configured to recover a clock based on the clock pattern, and not mask a region corresponding to an edge of the clock in the clock pattern of the masking period.

19. The backlight apparatus of claim 15, wherein each of the plurality of slave driving circuits is further configured to:

set a masking signal to a first level after the start of frame pattern of the transmission frame received through the daisy chain structure;

setting the masking signal to a second level after its own data packet;

start masking the transmission frame received through the daisy chain structure in response to the first level of the masking signal; and end masking the transmission frame received through the daisy chain structure in response to the second level of the masking signal.

20. A method of operating a backlight apparatus comprising a plurality of blocks, the method comprising:

generating a transmission frame comprising a clock training pattern and a plurality of data packets respectively corresponding to the plurality of blocks;

transferring the transmission frame to a plurality of driving circuits respectively corresponding to the plurality of blocks and connected in a daisy chain structure;

recovering a clock based on the clock training pattern in each of the plurality of driving circuits; and masking at least one of the data packets in each of the plurality of driving circuits.

* * * * *